United States Patent Office 3,288,815
Patented Nov. 29, 1966

3,288,815
1,4,5,8-TETRAHYDRO-1,4:5,8-DIMETHANO-9,10-ANTHRAQUINONE DISULFONIMIDES
Joseph E. Dunbar, Midland, Mich., assignor to The Dow Chemical Company, Midland, Mich., a corporation of Delaware
No Drawing. Filed May 8, 1964, Ser. No. 366,151
4 Claims. (Cl. 260—396)

This invention is directed to 1,4,5,8-tetrahydro-1,4:5,8-dimethano-9,10-anthraquinone disulfonimides having the structure

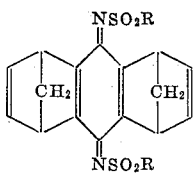

In the present specification and claims, R represents a lower alkyl containing up to and including 4 carbon atoms. These compounds are crystalline solids which are soluble in many common organic solvents and of low solubility in water. These products have been found to be useful as parasiticides for the control of many insect and fungal organisms.

The products of the present invention can be prepared by allowing lead tetraacetate to react with 1,4,5,8-tetrahydro-1,4:5,8-dimethano-9,10-anthracene disulfonamides having the structure

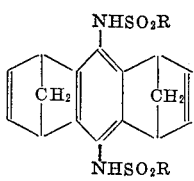

The reaction can conveniently be carried out in a liquid reaction medium such as methanol or ethanol and preferably in an aliphatic acid such as glacial acetic acid. The reaction can be carried out at any temperature in the range of from 0 to 90° C. and preferably at a temperature from 20° C. to 50° C. The amounts of the reactants to be employed are not critical, some of the desired product being formed when employing the reactants in any proportions.

In carrying out the reaction, the reactants can be combined in any convenient order or fashion. However, in a preferred procedure, the 1,4,5,8-tetrahydro-1,4:5,8-dimethano-9,10-anthracene disulfonamide starting materials such as 1,4,5,8-tetrahydro-1,4:5,8-dimethano-9,10-anthracenedipropanesulfonamide and 1,4,5,8-tetrahydro-1,4:5,8-dimethano-9,10-anthracenedibutanesulfonamide are admixed with the liquid reaction medium and the lead tetraacetate added with agitation to the mixture. Following the contacting, the reaction mixture can be maintained at the reaction temperature for a short period of time to insure completion of the reaction. The product is then isolated by any convenient method. In a preferred procedure, a small amount of a glycol such as ethylene glycol is added to the reaction mixture following the reaction period to destroy any excess lead tetraacetate which may be present. The reaction mixture is then stirred for an additional short period of time before the reaction mixture is diluted with water and processed exactly as described above.

*Example 1.—1,4,5,8-tetrahydro-1,4:5,8-dimethano-9,10-anthraquinone dimethanesulfonimide*

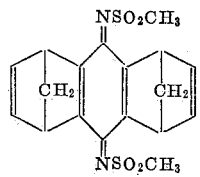

Lead tetraacetate (16.4 grams; 0.0370 mole) was added with stirring to 12.0 grams (0.0306 mole) of 1,4,5,8-tetrahydro - 1,4:5,8 - dimethano - 9,10 - anthracenedimethanesulfonamide which was suspended with stirring in 400 milliliters of glacial acetic acid. Stirring was thereafter continued and the reaction mixture was maintained at room temperature for 7.5 hours to insure completion of the reaction. At the end of this period, three milliliters of ethylene glycol were added to the reaction mixture and the resulting mixture stirred for an additional hour. Following this procedure, the reaction mixture was diluted with 400 milliliters of water and the red-brown 1,4,5,8-tetrahydro - 1,4:5,8 - dimethano - 9,10 - anthraquinonedimethanesulfonimide product collected by filtration. This product was recrystallized from acetonitrile. The red-brown crystals, which did not melt below 330° C., were found to have carbon, hydrogen and nitrogen contents of 55.34 percent, 4.55 percent and 7.33 percent, respectively, as compared with the theoretical contents of 55.37 percent, 4.65 percent and 7.18 percent, respectively.

In a similar method the following compounds of the present invention can be prepared.

1,4,5,8 - tetrahydro - 1,4:5,8 - dimethano - 9,10 - anthraquinonediethanesulfonimide (molecular weight 418.1) by reacting lead tetraacetate with 1,4,5,8-tetrahydro-1,4:5,8-dimethano-9,10-anthracenediethanesulfonamide.

1,4,5,8 - tetrahydro - 1,4:5,8 - dimethano - 9,10 - anthraquinonedipropanesulfonimide (molecular weight 446.1) by reacting lead tetraacetate with 1,4,5,8-tetrahydro-1,4:5,8 - dimethano - 9,10 - anthracenedipropanesulfonamide.

The new compounds of the present invention are useful as parasiticides. For such uses the unmodified compound can be employed. The product can also be dispersed on a finely divided solid and employed as a dust. Such mixtures can be dispersed in water with or without the aid of a surface active dispersing agent and the resulting aqueous dispersions employed as sprays, drenches or washes. In other procedures, the product of the invention can be employed as toxic constituents in solvent solutions, oil-in-water or water-in-oil emulsions or aqueous dispersions. In representative operations, aqueous compositions containing 1,4,5,8-tetrahydro-1,4:5,8-dimethano-9,10-anthraquinonedimethanesulfonimide at concentrations of 600 parts per million, by weight, gave substantially complete kills of *Phytophthora infestans*, the causative agent of late blight.

The 1,4,5,8 - tetrahydro - 1,4:5,8 - dimethano - 9,10-anthracenedisulfonamide starting materials can be prepared by aromatizing 1,4,4a,5,8,9a-hexahydro-1,4:5,8-dimethano-9,10-anthraquinone disulfonimides with a tertiary amine as a catalyst. Preferably the reaction is carried out in the presence of an inert solvent as reaction medium. The reaction mixture is maintained at a temperature between −10 and 100° C. for a period of time to insure completion of the reaction. The crystalline product is then obtained and purified by conventional procedures.

The 1,4,4a,5,8,9-hexahydro-1,4:5,8-dimethano-9,10-anthraquinone disulfonimides employed above can be prepared by allowing cyclopentadiene to react with 5,8-dihydro-5,8-methano-1,4-naphthoquinone dimethanesulfonimides having the structure

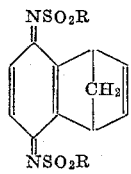

The reactants are usually dispersed in an organic solvent as reaction medium and the resulting mixture maintained at a temperature between 0 and 110° C. for a short period of time. The solid compound is collected and purified by conventional procedures.

The 5,8-dihydro-5,8-methano-1,4-naphthoquinone disulfonimide compound employed above can be prepared by reacting a p-benzoquinone disulfonimide compound having the structure

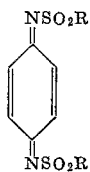

with cyclopentadiene in the presence of a tertiary amine to produce the disulfonamide compound. The reactants can be combined in the presence of an inert organic solvent and the reaction mixture maintained at a temperature between 0 and 110° C. for a short period of time. The solid product can then be collected and purified by conventional procedures. The disulfonamide compound is then oxidized to the disulfonimide with lead tetraacetate in glacial acetic acid.

I claim:
1. A compound corresponding to the formula

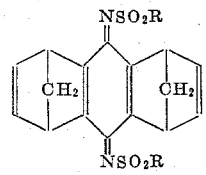

wherein R represents lower alkyl containing up to and including 4 carbon atoms.

2. 1,4,5,8 - tetrahydro - 1,4:5,8 - dimethano - 9,10 - anthraquinonedimethanesulfonamide.

3. 1,4,5,8 - tetrahydro - 1,4:5,8 - dimethano - 9,10 - anthraquinonediethanesulfonimide.

4. 1,4,5,8 - tetrahydro - 1,4:5,8 - dimethano - 9,10 - anthraquinone diisobutanesulfonimide.

No references cited.

WALTER A. MODANCE, *Primary Examiner.*

HARRY I. MOATZ, *Assistant Examiner.*